Sept. 19, 1967        E. ELIA        3,342,281
BICYCLE CONVERTIBLE INTO A MOTORIZED BICYCLE
Filed Oct. 7, 1965        4 Sheets-Sheet 2
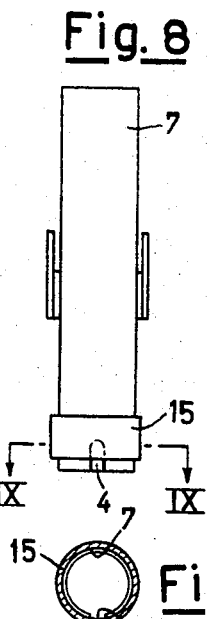
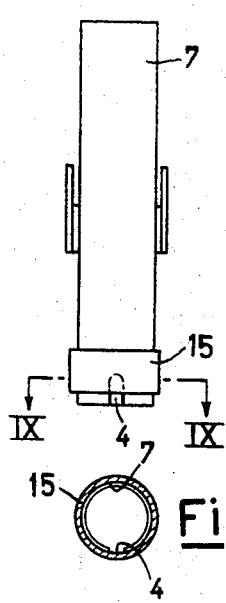
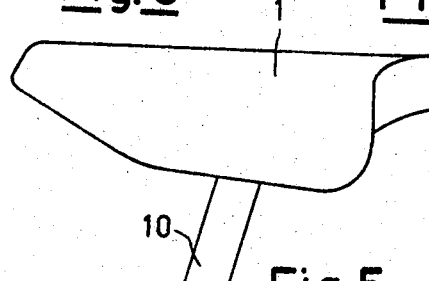
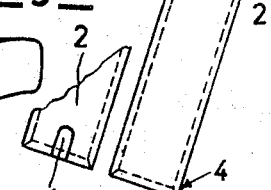
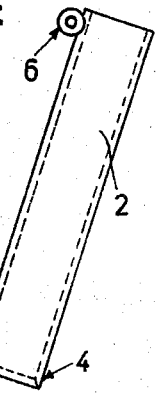
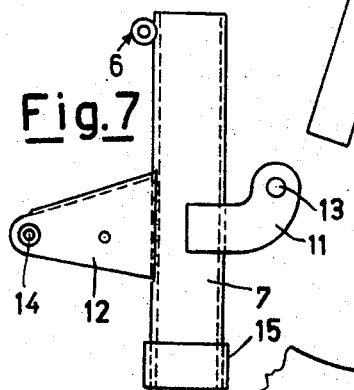
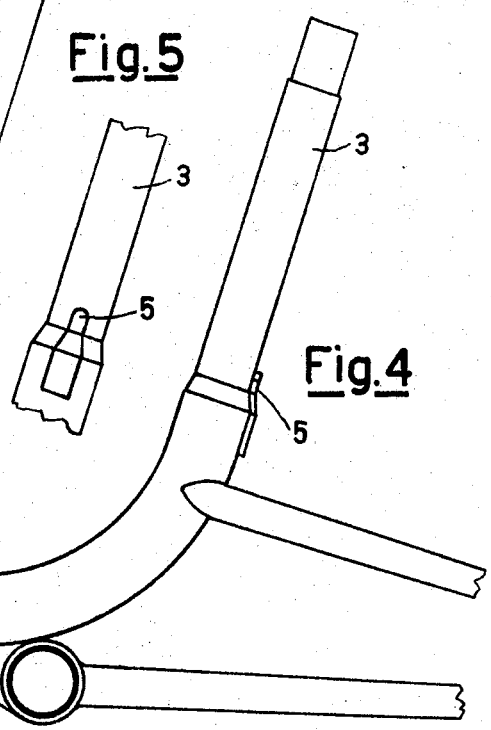

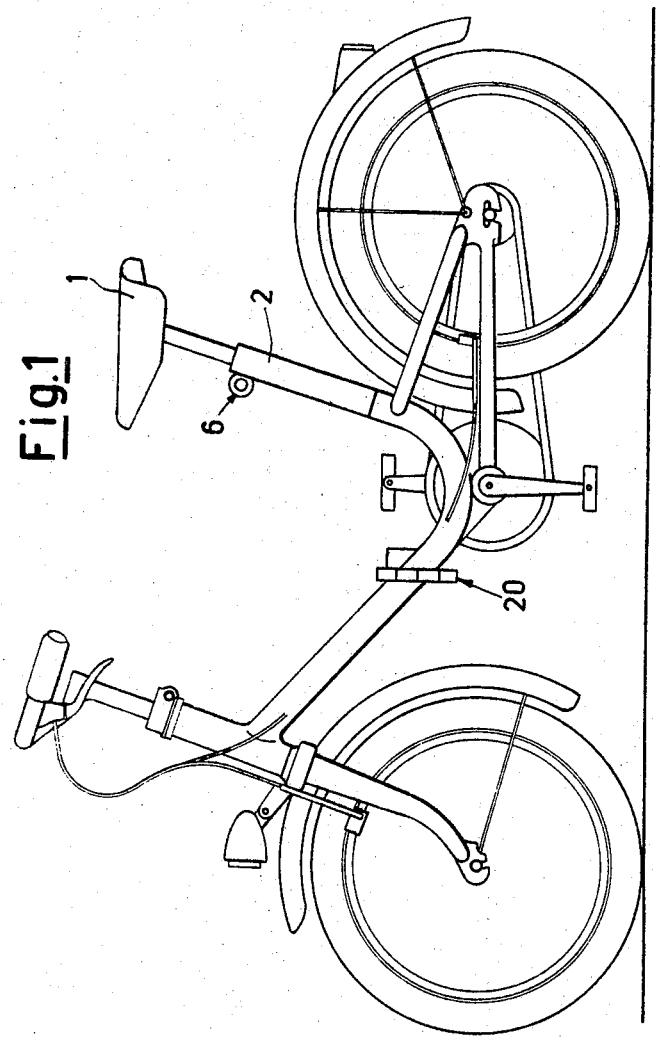

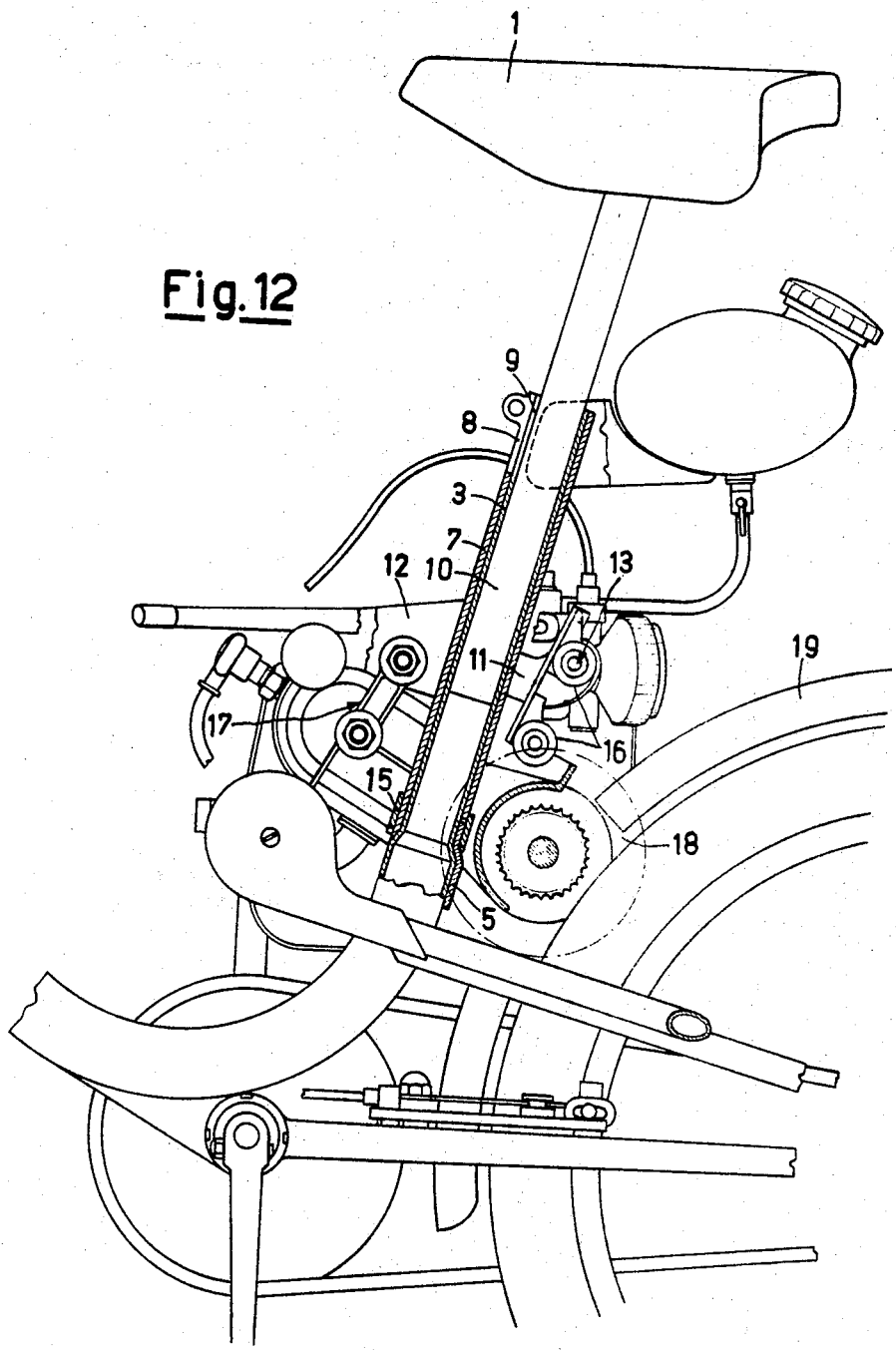

United States Patent Office 3,342,281
Patented Sept. 19, 1967

3,342,281
BICYCLE CONVERTIBLE INTO A MOTORIZED BICYCLE
Emilio Elia, Milan, Italy, assignor to S.p.A. Officine Metallurgiche Edoardo Bianchi-Velo, Milan, Italy, a company of Italy
Filed Oct. 7, 1965, Ser. No. 493,863
Claims priority, application Italy, Oct. 16, 1964,
22,334/64, Patent 737,612
3 Claims. (Cl. 180—33)

ABSTRACT OF THE DISCLOSURE

A bicycle selectively convertible into a motorized or pedal driven bicycle. The bicycle comprises a bicycle frame, a tubular cylindrical member secured to the frame and having opposite ends. A tongue is located at one of the ends and the cylindrical member is provided with a slot at the other of its ends, a pair of hollow bushings, one including means for supporting a drive means, such as an engine, the other bushing being free of such means. The bushings are selectively and replaceably mountable on the cylindrical member by being telescopically engaged on it, the bicycle is thereby convertible into a motorized bicycle and vice versa. The bushings each have a lower end provided with a slot for receiving the tongue on the tubular cylindrical member engaged on same to prevent rotation therebetween and an upper end with a slot corresponding to the slot in the cylindrical member. The latter two slots are in registry when the bushing is mounted on the tubular cylindrical member and the tongue is engaged in its slot. The bicycle further comprises a saddle including a saddle supporting shank engaged in the hollow bushing, and clamp fitting means mounted at the upper end of each bushing proximate the slot thereat, for cooperating with a clamp to secure together the saddle supporting the shank, the bushing and the tubular cylindrical member.

---

The present invention relates to a pedal bicycle, which can be converted into a motorized bicycle, by adding thereto a small propelling engine, this conversion being brought about in a particularly quick and easy manner, without resorting to the use of any tool.

According to the present invention, the member which connects the engine to the bicycle frame is formed by a telescopable coupling between an engine-carrying bushing and a cylindrical member affixed to the frame, in union with means capable of hindering a mutual rotation of said bushing and said member.

The aforesaid member is preferably formed by the saddle-supporting upright; in this embodiment a single clamp can simultaneously effect the locking of said bushing on the frame tubing and the locking of the latter on the saddle-carrying upright slipped therein.

The accompanying drawings show an exemplary embodiment of the bicycle which can be converted into a motorized bicycle according to the present invention; in more detail:

FIGURE 1 shows the bicycle in elevational view.
FIGURE 2 shows a bushing.
FIGURE 3 shows a detail of said bushing, turned 90° with respect to FIG. 2.
FIGURE 4 shows a cylindrical member solid with the frame.
FIGURE 5 shows a detail of said member, turned 90° with respect to FIG. 4.
FIGURE 6 is illustrative of a saddle.
FIGURE 7 shows a bushing for supporting the engine.
FIGURE 8 shows the bushing of FIG. 7, turned 90° with respect to FIG. 7.

Figure 10:
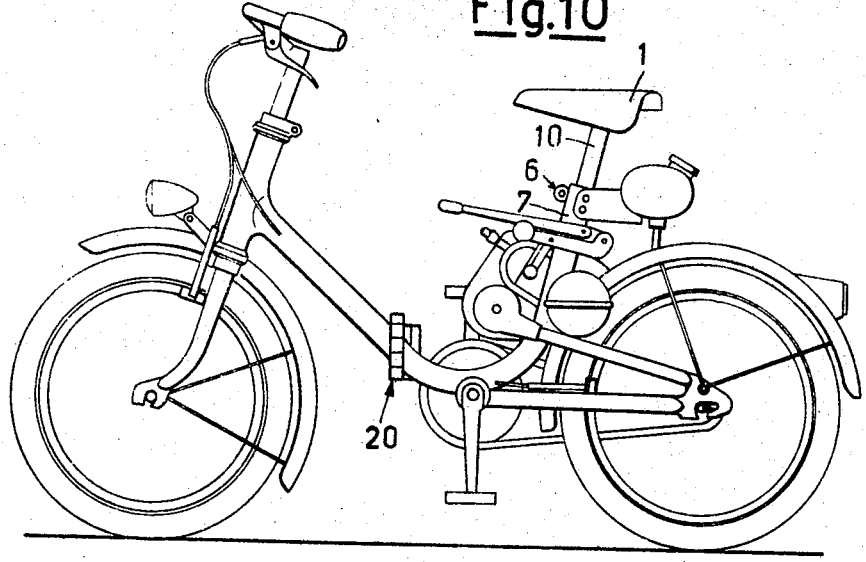
Figure 11:
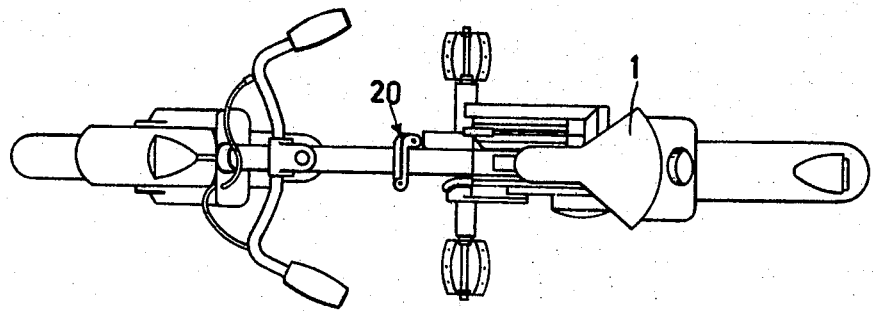

FIGURE 9 is a cross-sectional view taken along the line IX—IX of FIG. 8.
FIGURE 10 is an elevational view of a motorized bicycle.
FIGURE 11 is a plan view of the motorized bicycle.
FIGURE 12 is a detail relative to the application of the engine and the saddle to the frame of the vehicle.

The bicycle shown in FIG. 1 comprises a saddle 1 affixed to the vehicle's frame by a bushing 2; this latter bushing (see FIGS. 2 and 3) is a metallic tubular body capable of being slipped onto a tubular cylindrical member 3 (see FIG. 4), which cylindrical member is integral with the bicycle's frame (i.e. unitary with the remaining part of the frame). The bushing 2 has, in a top region thereof, and in correspondence with the fitting 6 a clamp, a slot directed along a generating line and extending a certain length, starting from the topmost edge of the bushing, as the slot 8 of a similar bushing 7 shown in FIG. 12 which will be described hereinafter. Cylindrical member 3 of the frame also is provided with a similar slot, 9 as shown in FIG. 12. The same bushing 2 has, in its bottom region, a short slot 4. At the base portion of the member 3, in correspondence with a part of the frame having an enlarged diameter there is mounted a metal tongue 5 solid with member 3. To affix the saddle 1 to the bicycle's frame, the bushing 2 is slipped onto the member 3 so that the upper portion of the tongue 5 engages slot 4; this engagement prevents the bushing 2 from being rotated. Metal rod 10, which is secured to the saddle is slipped into element 3, which is hollow. After the bushing 2 is tightened with a clamp (in correspondence with the fitting 6) and the bushing, on account of said slot provided along a generating line, is clamped onto the upper portion of the member 3. This latter, in turn, due to its respective slot 9, is clamped onto the rod 10, locking it up. The saddle 1 thus becomes affixed to the frame, the bicycle exhibiting the outline shown in FIG. 1. An engine, which is capable of being affixed to the bicycle frame, is furthermore provided to enable converting the bicycle into a motorized bicycle. For fastening the engine (shown in a diagrammatical fashion in FIG. 12) a bushing 7 is provided (shown in FIG. 12 and, in detail, in FIGS. 7, 8 and 9 in place of bushing 2, and similar to bushing 2 but having as contrasted with said latter, supporting members 11 and 12 solid with said bushing 7. The numerals 13 and 14 indicate holes in said supporting members 11 and 12, to provide a link connection for affixing the engine to the bushing 7.

The bushing 7 is provided (like bushing 2) with an upper slot 8, and a shorter lower slot 4 and the clamp 6 besides said slot 8. In its bottom portion, the bushing 7 has a ring 15.

The engine is connected to the bushing 7 and precisely to the supporting members 11 and 12 of said bushing, by links such as 16 and 17.

To affix the engine to the bicycle, the saddle 1 is first removed; to this end, it will suffice to release the clamp so as to disengage the bushing 2 and the rod 10, which are slipped out of the member 3 of the frame.

On the same member 3, the bushing 7 is slipped (to which the engine is fastened by the above mentioned links 16 and 17), in the course of said operation the slot 4 of the bushing 7 being slipped upon the upper portion of the above described tongue 5.

Thereafter the rod 10 of the saddle is slipped onto the member 3 and the upper portion of the bushing 7 is tightened with a clamp, which bushing, being tightened, in turn, due to the slot 8, locks the upper portion of the member 3 (due to the slot 9) on the rod 10.

The bushing 7 is thus affixed to the member 3 and, to this latter, is also affixed the rod 10. Stated another way, the engine is affixed to the frame and the saddle is also affixed thereto. The engagement between the slot 4 of bushing 7 and the tongue 5 prevents the bushing 7 from being angularly displaced on the member 3.

By this connection to the frame, a rotary member 18 actuated by the engine comes into contact with the rear wheel 19 of the bicycle so as to transfer, by frictional contact, the drive thereto. The motorized bicycle is as shown in FIGS. 10 and 11 and in the detail of FIG. 12. Obviously, to remove the engine from the vehicle, i.e. to convert the latter back into a pedal bicycle, the clamp is loosened so as to slip the bushing 7 out of the member 3. Once the bushing 2 has been slipped onto the latter member, the rod 10 is slipped onto the member 3 again and the bushing 2 is locked as aforesaid.

The bicycle frame, according to a preferred embodiment, can be made collapsible by means of a hinged connection 20 so as to reduce the bulk of the vehicle, this latter becoming thus susceptible of being stored in a restricted space.

The foregoing description has made conspicuous the constructional simplicity of the means for converting the vehicle from a pedal bicycle to a motorized bicycle, and vice versa. Likewise, the ease and rapidity with which the conversions can be made by even one who is without any particular mechanical skill, and without any necessity of tools, are self-explanatory.

What is claimed is:

1. A bicycle convertible into a motorized bicycle and vice versa which comprises a bicycle frame, a tubular cylindrical member secured to said frame and having opposite ends, a tongue at one of said ends, the cylindrical member being provided with a slot at the other of said ends, a pair of hollow bushings, one including means for supporting a drive means, the other being free of such means, said bushings being selectively and replaceably mounted on said cylindrical member by being telescopically engaged thereon, whereby the bicycle is convertible into a motorized bicycle and vice versa, said bushings each having a lower end provided with a slot for receiving the tongue on said tubular cylindrical member when telescopically engaged thereon to prevent relative rotation therebetween and an upper end with a slot corresponding to the slot in the cylindrical member, the latter slots being in registry when the bushing is mounted on the tubular cylindrical member and the tongue is engaged in the associated slot, a saddle including a saddle supporting shank engageable in the hollow bushing, and clamp fitting means mounted at the upper end of each bushing proximate the slot thereat, for cooperating with a clamp to secure together the saddle supporting shank, the bushing and the tubular cylindrical member.

2. A bicycle convertible into a motorized bicycle and vice versa as claimed in claim 1, wherein the bicycle frame is hinged for collapsing same.

3. A bicycle convertible into a motorized bicycle and vice versa as claimed in claim 1, wherein the hollow bushing including means for supporting a drive means comprises a hollow ring mounted on the lower end of the bushing to secure the engagement of the tongue in the slot associated therewith.

References Cited

UNITED STATES PATENTS

| 1,436,788 | 11/1922 | Baker | 180—33 |
| 2,574,824 | 11/1951 | Garelli | 180—33 |
| 2,770,479 | 11/1956 | Hilber | 280—281 |

FOREIGN PATENTS

| 1,024,129 | 1/1953 | France. |
| 1,071,281 | 3/1954 | France. |
| 479,193 | 3/1953 | Italy. |

KENNETH H. BETTS, *Primary Examiner.*